United States Patent
Xie et al.

(10) Patent No.: US 12,122,009 B2
(45) Date of Patent: Oct. 22, 2024

(54) WORKPIECE AND CUTTER POSE CALIBRATION METHOD BASED ON ROBOTIC EDGE MILLING ERROR TRACKING

(71) Applicant: Hunan University, Hunan (CN)

(72) Inventors: He Xie, Hunan (CN); Yaonan Wang, Hunan (CN); Hui Zhang, Hunan (CN); Jianxu Mao, Hunan (CN)

(73) Assignee: Hunan University, Hunan (CN)

( * ) Notice: Subject to any disclaimer, the term of this patent is extended or adjusted under 35 U.S.C. 154(b) by 0 days.

(21) Appl. No.: 18/733,869

(22) Filed: Jun. 5, 2024

(65) Prior Publication Data

US 2024/0316716 A1     Sep. 26, 2024

Related U.S. Application Data

(63) Continuation of application No. PCT/CN2023/091130, filed on Apr. 27, 2023.

(30) Foreign Application Priority Data

Jul. 5, 2022  (CN) .......................... 202210785829.1

(51) Int. Cl.
*B23Q 17/22*  (2006.01)
*B23C 3/12*  (2006.01)

(52) U.S. Cl.
CPC ............... *B23Q 17/22* (2013.01); *B23C 3/12* (2013.01); *B23C 2235/21* (2013.01); *B23Q 2717/006* (2013.01)

(58) Field of Classification Search
CPC .... B23Q 17/22; B23Q 2717/006; B23C 3/12; B23C 2235/21
See application file for complete search history.

(56) References Cited

U.S. PATENT DOCUMENTS 4,907,169 A  *  3/1990  Lovoi .................... B23K 26/21
                                                          348/90
6,681,145 B1 *  1/2004  Greenwood ........... B25J 9/1692
                                                          700/193
(Continued)

FOREIGN PATENT DOCUMENTS

CN           105643399          6/2016
CN           111958611          11/2020
(Continued)

OTHER PUBLICATIONS

"International Search Report (Form PCT/ISA/210) of PCT/CN2023/091130", mailed on Jul. 30, 2023, with English translation thereof, pp. 1-6.

*Primary Examiner* — Ramesh B Patel
(74) *Attorney, Agent, or Firm* — JCIPRNET

(57) ABSTRACT

A workpiece and cutter pose calibration method based on robotic edge milling error tracking, including: 1. generating an edge milling trajectory point cloud; 2. obtaining an actual edge milling three-dimensional point cloud; 3. generating an updated edge milling three-dimensional point cloud; 4. calculating an edge milling allowance error and a posture inclination error; 5. solving position errors of the workpiece and cutter; 6. solving posture errors of the workpiece and cutter; 7. updating pose parameters of the workpiece and cutter; 8. repeating steps 4 to 7 until pose error vectors of the workpiece and cutter are both not greater than corresponding preset thresholds. The disclosure performs error comparison, error modeling, and error tracking on the three-dimensional point cloud and edge milling trajectory point cloud, even if the cutter has system errors such as axis deviation, the disclosure can accurately identify pose errors of the workpiece and cutter during edge milling.

10 Claims, 3 Drawing Sheets

(56) References Cited

U.S. PATENT DOCUMENTS

| | | | | |
|---|---|---|---|---|
| 10,449,654 B2* | 10/2019 | Campolo | ............... | B24B 27/027 |
| 10,540,779 B2* | 1/2020 | Shih | ........................... | G06T 7/70 |
| 11,055,562 B1* | 7/2021 | Haeusler | ................ | B25J 9/1697 |
| 11,379,717 B2* | 7/2022 | Malhotra | ................ | G16H 50/20 |
| 11,514,221 B2* | 11/2022 | Or-Bach | ................ | G06F 30/394 |
| 11,615,228 B1* | 3/2023 | Or-Bach | ................ | G06F 30/392 |
| | | | | 716/128 |
| 11,833,679 B2* | 12/2023 | Okuyama | ............... | B25J 9/1671 |
| 2020/0012938 A1* | 1/2020 | Malhotra | ................ | G06N 3/088 |
| 2021/0209407 A1* | 7/2021 | Haeusler | ............... | G06V 10/757 |

FOREIGN PATENT DOCUMENTS

| | | |
|---|---|---|
| CN | 112828359 | 5/2021 |
| CN | 113739717 | 12/2021 |
| CN | 115145221 | 10/2022 |
| JP | 2011189417 | 9/2011 |

\* cited by examiner

Step 10, construct an edge milling path of a cutter to a workpiece to generate a robotic edge milling trajectory point cloud Q;

Step S20, obtain an actual edge milling three-dimensional point cloud P of the workpiece;

Step S30, match the edge milling trajectory point cloud Q and the actual edge milling three-dimensional point cloud P into the same coordinate system to generate a pose updated edge milling three-dimensional point cloud P';

Step S40, calculate an edge milling allowance error $e_i$ and an posture inclination error $\alpha_i$ according to the edge milling trajectory point cloud Q and the edge milling three-dimensional point cloud P';

Step 50, establish respectively an influence model of a position error of the workpiece on the edge milling allowance error and an influence model of a position error of the cutter on the edge milling allowance error when milling an i-th point of the workpiece according to the edge milling allowance error $e_i$, and solve a workpiece position error $^{W}d$ and a cutter position error $^{U}d_z$;

Step S60, establish respectively an influence model of a posture error of the workpiece on the edge milling error and an influence model of a posture error of the cutter on the edge milling error when milling the i-th point of the workpiece according to the posture inclination error $\alpha_i$, and solve a workpiece posture error $^{U}\delta_X$ and a cutter posture error $^{W}\delta$;

Step S70, update a workpiece pose parameter and a cutter pose parameter according to the workpiece position error $^{W}d$, the cutter position error $^{U}d_z$, the workpiece posture error $^{U}\delta_X$, and the cutter posture error $^{W}\delta$;

Step S80, repeat Step S40 to Step S70 until a workpiece pose error vector is $^{W}V$ and a cutter pose error vector is $^{U}V$ and both of the vectors are less than or equal to corresponding preset thresholds.

FIG. 1

WORKPIECE AND CUTTER POSE CALIBRATION METHOD BASED ON ROBOTIC EDGE MILLING ERROR TRACKING

CROSS-REFERENCE TO RELATED APPLICATION

This application is a continuation of international application of PCT application serial no. PCT/CN2023/091130, filed on Apr. 27, 2023, which claims the priority benefit of China application no. 202210785829.1, filed on Jul. 5, 2022. The entirety of each of the above-mentioned patent applications is hereby incorporated by reference herein and made a part of this specification.

BACKGROUND

Technical Field

The disclosure belongs to the technical field of skin edge milling, and in particular to a workpiece and cutter pose calibration method based on robotic edge milling error tracking.

Description of Related Art

Large skins such as satellite load-bearing cylinders, spacecraft sealed cabins, and aircraft fuselages are the main components of aerospace equipment, which have geometric features such as large free-form curved surfaces, thin walls, and easy deformation. As a result, edge milling of skins has always been a research difficulty in this field. The edge milling of the skin includes processes such as cutting, bending to form, and edge milling, in which edge milling is the last step before skin assembly, which has a significant impact on the sealing and safety performance of the aerospace equipment. Therefore, it is crucial to ensure the edge milling accuracy of the skin. Currently, the skin edge milling in China mainly relies on manual work, which has the characteristics of, for example, low accuracy of edge milling, poor consistency, and low efficiency, thereby it is difficult for the technology to meet the needs of high-quality development of aerospace equipment manufacturing in China. Robots have advantages such as high flexibility, large working range, and easy expansion, and provide a new solution for robotic skin edge milling. As it may be seen from the development trend, manual edge milling is going to be gradually replaced by robotic edge milling.

In the robotic skin edge milling system, in order to meet the edge milling accuracy requirements, it is necessary to accurately calibrate the workpiece coordinate system pose and the edge milling cutter coordinate system pose for the skin, that is, to determine the relative pose of the workpiece and cutter coordinate systems in the base coordinate system of the robot. Currently, the workpiece and cutter pose calibration methods for robotic edge milling are mainly as follows. 1) Ejector method: the spatial position of the milling cutter is determined by the contact between the outer contour of the milling cutter and the ejector, and then calibration is realized through six-point positioning. 2) LVDT method: the method is to replace the ejector with an LVDT (linear variable differential transformer), LVDT can automatically identify the contact status of feature points and determine the positions, which avoids the need to determine the contact status with the naked eye, but the non-contact feature direction is still determined by the naked eye. 3) Ball calibration method: the method replaces the ejector with a standard ball and a sapphire probe, thereby the "point-to-point" contact of the ejector is upgraded to "ball-to-ball" contact. 4) Laser tracker method: the method is to stick the reflective target ball to the cutter, and then the pose of the target ball is recorded through the laser tracker to achieve cutter calibration.

The above four methods have problems as follows. 1) The robot controls the ejector to touch the cutter, and each touch corresponds to only one piece of data. The small amount of data (<100) greatly limits the stability of the calibration results. 2) The above calibration methods are all for calibration when the milling cutter is stationary, which cannot reflect the pose error caused by factors such as cutter rotation deviation, cutter deformation from force, and vibration during the milling process, which may easily cause large calibration errors. 3) The feature points on the cutter are not notable, searching the points by naked eyes has to be performed by highly experienced workers, and the accuracy is low.

SUMMARY

The disclosure provides a workpiece and cutter pose calibration method based on robotic edge milling error tracking to solve the technical problems of large calibration errors and low accuracy in the related art.

To achieve the above purpose, the technical solution of the disclosure is implemented as follows.

The disclosure provides a workpiece and cutter pose calibration method based on robotic edge milling error tracking, which includes steps as follows.

Step S10. An edge milling path of a cutter to a workpiece is constructed, and an edge milling trajectory point cloud Q processed by a robot is generated.

Step S20. An actual edge milling three-dimensional point cloud P of the workpiece is obtained.

Step S30. The edge milling trajectory point cloud Q and the actual three-dimensional point cloud P of the workpiece are matched into the same coordinate system to generate a pose updated three-dimensional point cloud P'.

Step S40. An edge milling allowance error $e_i$ and a posture inclination error $\alpha_i$ are calculated according to the edge milling trajectory point cloud Q and the pose updated edge milling three-dimensional point cloud P'.

Step S50. An influence model of a position error of the workpiece on the edge milling allowance error and an influence model of a position error of the cutter on the edge milling allowance error when milling an i-th point of the workpiece are established according to the edge milling allowance error $e_i$, and a workpiece position error $^W d$ and a cutter position error $^U d_z$ are solved.

Step S60. An influence model of a posture error of the workpiece on the edge milling error and an influence model of a posture error of the cutter on the edge milling error when milling the i-th point of the workpiece are established according to the posture inclination error $\alpha_i$, and a workpiece pose error $^U \delta_x$ and a cutter pose error $^W \delta$ are solved.

Step S70. A workpiece pose parameter and a cutter pose parameters are updated according to the workpiece position error $^W d$, the cutter position error $^U d_z$, the workpiece pose error $^U \delta_x$, and the cutter pose error $^W \delta$.

Step S80. Step S40 to Step S70 are repeated until a workpiece pose error vector is $^W V$ and a cutter pose error vector $^U V$ and both of the vectors are not greater than corresponding preset thresholds.

Furthermore, Step S10 is specifically as follows. A boundary cross-section of a design model of the workpiece is discretized uniformly to generate the uniform and orderly edge milling trajectory point cloud Q={$q_1, q_2, \ldots, q_i, \ldots, q_n$}. Any point $q_i$ in the edge milling trajectory point cloud Q is a vector of 3×1, a unit normal vector $w_i$ of $q_i$ is perpendicular to a boundary lateral cross-section, and a positive direction is toward outside of the cross-section and is the same as an edge milling depth direction. A first unit tangent vector $\tau_{i1}$ of the point $q_i$ is parallel to a cross-section boundary direction and is the same as a motion direction of an edge milling trajectory. A second unit tangent vector $\tau_{i2}$ of the point $q_i$ is parallel to a curved surface thickness direction. A coordinate system of the point $q_i$ is constituted together by the three vectors ($\tau_{i1}, \tau_{i2}, w_i$), in which the three vectors respectively correspond to directions of the x-axis, the y-axis, and the z-axis.

Furthermore, Step S20 specifically includes steps as follows.

Step S21. An initial workpiece pose parameter and an initial cutter pose parameter are respectively defined as $_W^BT$ and $_U^BT$, in which $_W^BT$ represents a pose of a workpiece coordinate system {W} relative to a base coordinate system {B}, $_U^BT$ represents a pose of a cutter coordinate system {U} relative to the base coordinate system {B}, and both of the workpiece pose parameter $_W^BT$ and the cutter pose parameter $_U^BT$ are homogeneous transformation matrices of 4×4.

Step S22. Pose positioning is performed on an end of edge milling through the workpiece pose parameter $_W^BT$ and the cutter pose parameter $_U^BT$.

Step S23. Edge milling is performed on a workpiece blank according to the edge milling path constructed. After completion, Three-dimensional scanning is performed on a surface to be milling processed of the workpiece by a three-dimensional scanning device to obtain the actual edge milling three-dimensional point cloud P of the workpiece. Each point on the actual edge milling three-dimensional point cloud P is a vector of 3×1.

Furthermore, the step S30 specifically includes the following steps.

Step S31. A closest point to the point $q_i$ in the actual edge milling three-dimensional point cloud P is searched for and denoted as $p_a$, in which the search is for any point in the edge milling trajectory point cloud Q, and i=1, 2, . . . , n.

Step S32. A matching objective function $f(R,t)$ based on uniform allowance is constructed using the point pair ($q_i$, $p_a$), in which R, t respectively represents a rotation posture matrix of 3×3 of the actual edge milling three-dimensional point cloud P and a translation position matrix of 3×1 of the edge milling trajectory point cloud Q; then the pose parameters R and t are solved by minimizing the objective function.

Step S33. A position of any point on the actual edge milling three-dimensional point cloud P is updated as $p_i' = Rp_a + t$, and $p_i = p_i'$ is assigned to obtain the pose updated edge milling three-dimensional point cloud P'={$p_1', p_2', \ldots, p_a', \ldots, p_m'$}.

Furthermore, the objective function to be minimized in Step S32 is min $$f(R, t) = \sum_{i=1}^{n} d_i^2 - \left(\sum_{i=1}^{n} d_i\right)^2 / n,$$

in which $d_i = \|Rp_a + t - q_i\|$, $d_i$ represents a distance from 1-1 point $p_a'$ to point $q_i$, and n represents the number of points in the edge milling trajectory point cloud Q.

Furthermore, Step S40 specifically includes steps as follows.

Step S41. A closest point $p_a'$ to the point $q_i$ is extracted from the updated edge milling three-dimensional point cloud P' according to the edge milling trajectory point cloud Q, and then the edge milling allowance error of the point $q_i$ is $e_i = (q_i - p_a')^T w_i$.

Step S42. The operation is started from the point $q_i$ to search for an upper boundary point $q_{ui}$ and a lower boundary point $q_{li}$ of the point $q_i$ along a positive direction of the second unit tangent vector $\tau_{i2}$ in the cross-section design model according to the edge milling trajectory point cloud Q, further, closest points ($p_{ua}', p_{la}'$) to the points ($q_{ui}, q_{li}$) are respectively extracted from the edge milling three-dimensional point cloud P' to construct an error vector $\tau_{i2}' = (2p_{ua}' - p_a' - p_{la}')/\|2p_{ua}' - p_a' - p_{la}'\|$ of a boundary inclination direction; and then the posture inclination error of edge milling is $\alpha_i = \arccos(\tau_{i2}^T \tau_{i2}')$.

Furthermore, Step S50 specifically includes the following steps.

Step S51. A position error vector of the initial workpiece pose parameter $_W^BT$ of the workpiece is defined as $^Wd$, a position error vector of the initial cutter pose parameter $_U^BT$ is defined as $^Ud$, and both $^Wd$ and $^Ud$ are vectors to be solved of 3×1, in which $^Ud$ is further expressed as $^Ud = [0, 0, ^Ud_z]^T$, and $^Ud_z$ is a component of $^Ud$ on a z-axis.

Step S52. The influence model of the position error of the workpiece on the edge milling allowance error and the influence model of the position error of the cutter on the edge milling allowance error when milling the i-th point of the workpiece are established respectively, in which the influence model of the position error of the workpiece on the edge milling allowance error when milling the i-th point of the workpiece is $e_{iw} = ^W d^T w_i$, and the influence model of the position error of the cutter on the edge milling allowance error when milling the i-th point of the workpiece is $e_{iu} = ^U d_z$. The two influence models established are combined to obtain an influence model of a combined error when milling the i-th point of the workpiece, in which the model is $e_i = ^W d^T w_i + ^U d_z$, and $w_i$ represents the unit normal vector of $q_i$.

Step S53. The influence model of the combined error when milling the i-th point of the workpiece is used to establish a matrix formula $e = ^W d^T N + ^U D$ for position error identification of all contact points of the workpiece and the cutter at different times, in which $N = [n_1, n_2, \ldots, n_i, \ldots n_n]$ is a matrix of 3×n, and $e = [e_1, e_2, \ldots, e_i, \ldots e_n]$ and $^U D = [^U d_z, ^U d_z, \ldots, ^U d_z]_{1 \times n}$ are matrices of 1×n; the n in the above represents the number of points in the edge milling trajectory point cloud Q; and then the cutter position error is $$^U d_z = \sum_{i=1}^{n} e_i / n,$$

and the workpiece position error is $^W d = (NN^T)^{-1} N(e - ^U D)^T$.

Furthermore, Step S60 includes steps as follows.

Step S61. A posture error vector of the initial workpiece pose parameter $_W^BT$ of the workpiece blank is defined as $^W\delta$, a posture error vector of the initial cutter pose parameter $_U^BT$ is defined as $^U\delta$, and both $^W\delta$ and $^U\delta$ are vectors to be solved of 3×1; in which $^U\delta$ is further expressed as $^U\delta = [^U\delta_x, 0, 0]^T$, and $^U\delta_x$ is a component of $^U\delta$ on an x-axis.

Step S62. The influence model of the posture error of the workpiece on the edge milling error and the influence model of the posture error of the cutter on the edge milling error when milling the i-th point of the workpiece are respectively established, in which the influence model of the posture error of the workpiece on the edge milling error when milling the i-th point of the workpiece is $\alpha_{iw}=\tau_{i2}^{T\ W}\delta$, and the influence model of the posture error of the cutter on the edge milling error when milling the i-th point of the workpiece is $\alpha_{iu}={}^U\delta_x$; the two influence models established are combined to obtain an influence model of a combined error when milling the i-th point of the workpiece, in which the model is $$\alpha_i = {}^U\delta_x + \tau_{i2}^{TW}\delta = \begin{bmatrix} 1, \tau_{i2}^T \end{bmatrix}\begin{bmatrix} {}^U\delta_x \\ {}^W\delta \end{bmatrix} = a_i\xi,$$

$$a_i = \begin{bmatrix} 1, \tau_{i2}^T \end{bmatrix}$$

is a coefficient matrix of 1×4, and $$\xi = \begin{bmatrix} {}^U\delta_x \\ {}^W\delta \end{bmatrix}$$

is a workpiece cutter posture error combination vector of 4×1.

Step S63. The influence model of the combined error of the i-th point is used to establish a posture error identification formula $\alpha=A\xi$ of all milling points of the workpiece and the cutter at different times, in which $\alpha=[\alpha_1, \alpha_2, \ldots, \alpha_i, \ldots \alpha_n]^T$ is a matrix of n×1, and $A=[a_1^T, a_2^T, \ldots, a_n^T]^T$ is a matrix of n×4; the workpiece and cutter pose combined error is solved as $\xi=(A^TA)^{-1}A^T\alpha$, in which $$I_1 = [1, 0, 0, 0], I_3 = \begin{bmatrix} 0 & 1 & 0 & 0 \\ 0 & 0 & 1 & 0 \\ 0 & 0 & 0 & 1 \end{bmatrix},$$

and the workpiece posture error and the cutter posture error are respectively ${}^U\delta_x=I_1\xi$, ${}^W\delta=I_3\xi$.

Furthermore, the unit normal vectors of all points on the edge milling trajectory point cloud Q in Step S10 satisfies $$\sum_{i=1}^{n} w_i = 0_{3\times 1}.$$

Furthermore, the number n of points on the edge milling trajectory point cloud Q in Step S10 satisfies n≥6.

Beneficial effects of the disclosure are as follows.

1. The disclosure identifies and compensates for the pose errors of the workpiece/cutter by performing error comparison, error modeling, and error tracking on the edge milling trajectory of the edge milling and design model after robotic edge milling. Compared with the existing pose construction method before edge milling, even if the cutter has system errors such as axis deviation and edge milling deformation from force, the pose errors of the workpiece and cutter during the robotic edge milling process can be accurately identified without having to accurately know the influence factors of the workpiece and cutter pose errors, which can effectively solve the calibration accuracy problem caused by the diversity and complexity of robotic edge milling system errors, and can be widely used in robotic edge milling of thin-walled curved surface skins in aerospace.

2. The disclosure adopts a stitched objective function based on allowance homogenization, which can accurately unify the edge milling trajectory point cloud Q and the actual edge milling three-dimensional point cloud P of the workpiece into the same coordinate system. Compared with the currently commonly used stitching method based on the minimum sum of squared distances, the disclosure can solve problems of unstable stitching when the measured point cloud has defects such as uneven density distribution and incomplete shape, and prevent the measured point cloud from inclining toward the dense place of the point cloud during stitching, thereby the stitching accuracy and the allowance calculation accuracy during the edge milling pose calibration process is improved.

3. The disclosure uses the edge milling trajectory point cloud Q of the free-form curved surface and the actual edge milling three-dimensional point cloud P of the workpiece as input data to establish the influence models of the position errors of the workpiece and cutter and solve the models. Compared with the conventional method based on coordinate system construction, on the one hand, the amount of data acquired per unit time has been significantly increased (the amount of point cloud data has increased from a dimension of 10 to a dimension of 100,000), which is conducive to improving the stability of the calibration results and the calibration efficiency at the same time; on the other hand, during the data collection process, the method does not need to determine the contact state between the calibration object and the ejector/LVDT (linear variable differential transformer) by naked eye observation, and does not need to strictly control the robot to perform specific pose movements, which is conducive to improving the accuracy of data acquisition and the convenience of calibration.

4. The disclosure uses any curved surface as the calibration object, and has no strict requirements on the shape and size of the calibration object. During the calibration process, it is not necessary to make the measuring instrument pass through a specific position of the boundary of the curved surface, which solves the problems of high manufacturing accuracy requirements, high cost, and limited calibration range of the conventional calibration method for regular objects (for example, spheres, disks, and cylinders). The method may also use the curved surface workpiece required for edge milling as the calibration object, thereby the edge milling accuracy is directly improved through calibration.

BRIEF DESCRIPTION OF THE DRAWINGS

FIG. 1 is a schematic diagram of a process of the disclosure.

DESCRIPTION OF THE EMBODIMENTS

The disclosure will be further described in detail below with reference to the accompanying drawings and specific embodiments.

Referring to FIG. 1, a workpiece and cutter pose calibration method based on robotic edge milling error tracking according to an embodiment of the disclosure is provided, which includes steps as follows.

Step S10. An edge milling path of a cutter to a workpiece is constructed, and an edge milling trajectory point cloud Q processed by a robot is generated.

Figure 2:
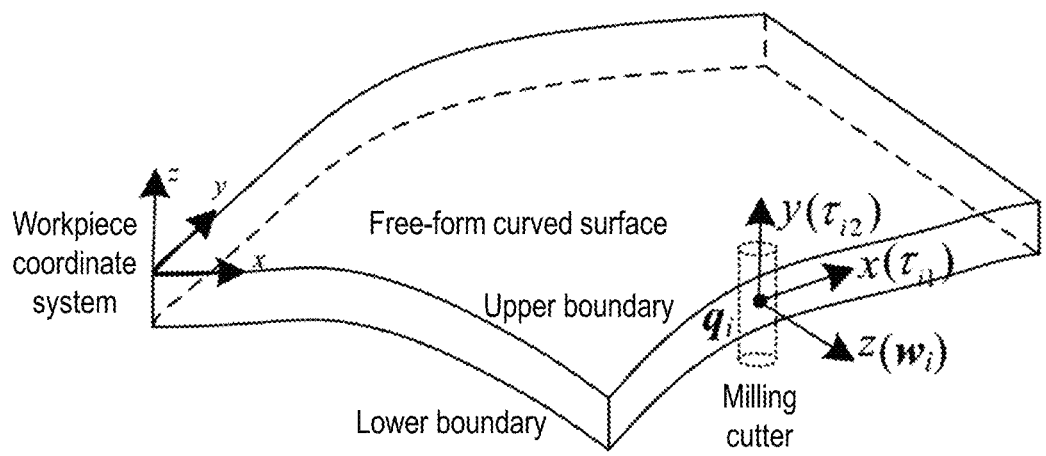
FIG. 2 is a schematic structural diagram of a coordinate system of an edge milling trajectory point cloud Q.

A boundary cross-section of an edge to be milled of a workpiece design model is penetrated by a three-dimensional detection software to obtain a cross-section curve. As shown in FIG. 2, the cross-section curve is discretized uniformly to generate the uniform and orderly edge milling trajectory point cloud Q={$q_1, q_2, \ldots, q_i, \ldots, q_n$}, in which a number n satisfies n≥6, and preferably, the number n=1000. Least squares plane fitting is performed on a neighborhood of each point $q_i$, in which a plane unit normal is used as a unit normal vector $w_i$ of the point $q_i$, a unit direction $(q_i-q_{i+1})/\|q_i-q_{i+1}\|$ of a line connecting adjacent points is used as a first unit tangent vector $\tau_{i1}$ of the point $q_i$, and a second unit tangent vector $\tau_{i2}$ of the point $q_i$ may be obtained by cross product $\tau_{i2}=w_i \times \tau_{i1}$. An edge milling coordinate system of the point $q_i$ is constituted together by the three vectors $(\tau_{i1}, \tau_{i2}, w_i)$, which respectively correspond to directions of an x-axis, a y-axis, and a z-axis. The edge to be milled may be a plane or may be a free-form curved surface. The unit normal vectors of all points in the edge milling trajectory point cloud Q satisfy $$\sum_{i=1}^{n} w_i = 0_{3 \times 1}.$$

Step S20. An actual edge milling three-dimensional point cloud P of the workpiece is obtained, in which a number m of points in the actual edge milling three-dimensional point cloud P satisfies m≥3n, and n is the number of points in the edge milling trajectory point cloud Q.

Step S30. The edge milling trajectory point cloud Q and the three-dimensional point cloud P are matched into the same coordinate system to generate a pose updated three-dimensional point cloud P'.

Step S40. An edge milling allowance error $e_i$ and an posture inclination error $\alpha_i$ are calculated according to the edge milling trajectory point cloud Q and the edge milling three-dimensional point cloud P'.

Step S50. An influence model of a position error of the workpiece on the edge milling allowance error and an influence model of a position error of the cutter on the edge milling allowance error when milling an i-th point of the workpiece are established according to the edge milling allowance error $e_i$, and a workpiece position error $^Wd$ and a cutter position error $^Ud_z$ are solved.

Step S60. An influence model of a posture error of the workpiece on the edge milling error and an influence model of a posture error of the cutter on the edge milling error when milling the i-th point of the workpiece are established according to the posture inclination error $\alpha_i$, and a workpiece pose error $^U\delta_x$ and a cutter pose error $^W\delta$ are solved.

Step S70. A workpiece pose parameter and a cutter pose parameters are updated according to the workpiece position error $^Wd$, the cutter position error $^Ud_z$, the workpiece pose error $^U\delta_x$, and the cutter pose error $^W\delta$.

Step S80. Step S40 to Step S70 are repeated until a workpiece pose error vector is $^WV$ and a cutter pose error vector $^UV$ and both of the vectors are not greater than corresponding preset thresholds.

In this embodiment, the preset thresholds of the workpiece pose error vector and the cutter pose error vector may both be 0.003.

Update workpiece and cutter posture parameters: a workpiece pose error vector of 6×1 is denoted as $^WV=[^Wd^T, {^W\delta}^T]^T$, and the updated workpiece pose parameter is $_W^BT'=_W^BTe^{[^WV]}$. A cutter pose error vector of 6×1 is denoted as $^UV=[0,0, {^Ud_z}, {^U\delta_x}, 0,0]^T$, and the updated cutter pose parameter is $_U^BT'=_U^BTe^{[^UV]}$, in which for any vector $V=[d_x, d_y, d_z, \delta_x, \delta_y, \delta_z]^T$, the expression of $[^UV]$ is:

$$[^UV] = \begin{bmatrix} 0 & -{^U\delta_z} & {^U\delta_y} & {^Ud_x} \\ {^U\delta_z} & 0 & -{^U\delta_x} & {^Ud_y} \\ -{^U\delta_y} & {^U\delta_x} & 0 & {^Ud_z} \\ 0 & 0 & 0 & 0 \end{bmatrix}.$$

Figure 4:
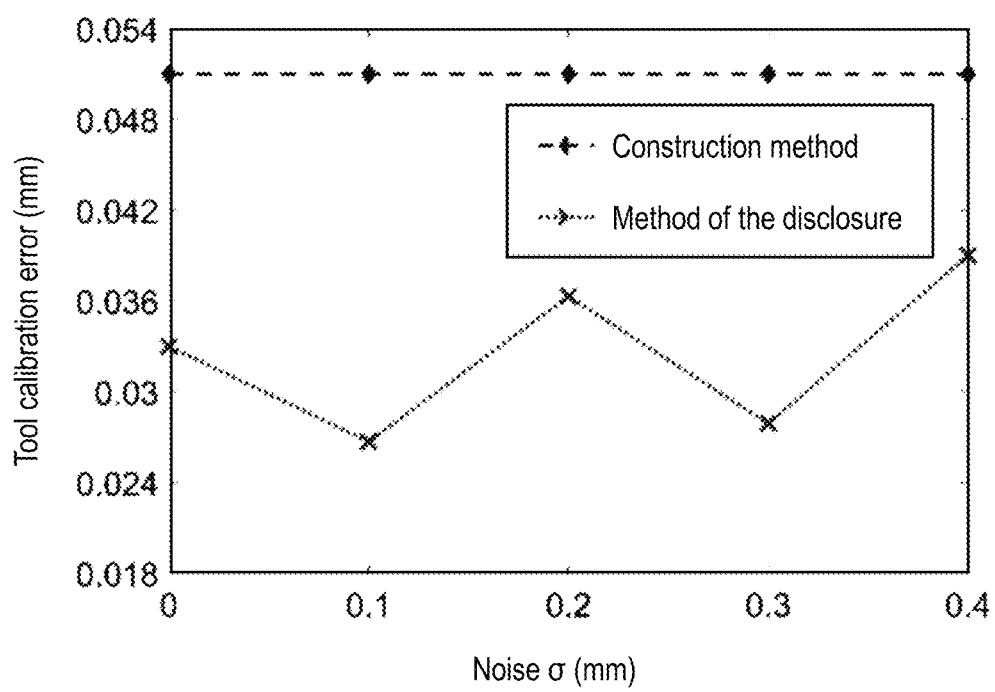
FIG. 4 is a schematic diagram of calibration error results of a cutter when measuring a point cloud under different Gaussian noise conditions.

FIG. 4 shows the comparison results of workpiece pose calibration errors when measuring the actual edge milling three-dimensional point cloud P under different Gaussian noise conditions. It may be seen that when the Gaussian noise is large, the calibration error of the method according to the disclosure is smaller than the conventional construction method, and the result is more stable.

The step S20 specifically includes the following steps.

Step S21. An initial workpiece pose parameter and an initial cutter pose parameter are respectively defined as $_W^BT$ and $_U^BT$, in which $_W^BT$ represents a pose of a workpiece coordinate system {W} relative to a base coordinate system {B}, $_U^BT$ represents a pose of a cutter coordinate system {U} relative to the base coordinate system {B}, and both of the workpiece pose parameter $_W^BT$ and the cutter pose parameter $_U^BT$ are homogeneous transformation matrices of 4×4; the initial workpiece pose parameter and the initial cutter pose parameter may be calibrated by methods such as ejector and LVDT. The calibration of the initial pose is not limited to a specific method, and there is no strict requirement for the calibration accuracy.

Step S22. Pose positioning is performed on an end of edge milling through the workpiece pose parameter $_W^BT$ and the cutter pose parameter $_U^BT$.

Step S23. Edge milling is performed on a workpiece blank according to a set trajectory, in which the edge milling allowance given is 0.5 mm. Three-dimensional scanning is performed on the milling edge of the workpiece by a three-dimensional scanning device to form the actual edge milling three-dimensional point cloud P of edge milling, in which P={$p_1, p_2, \ldots, p_i, \ldots, p_m$}, and each point on the actual edge milling three-dimensional point cloud P is a vector of 3×1. The number m of points in the actual edge milling three-dimensional point cloud P is approximately 120,000.

The Step S30 specifically includes the following steps.

Step S31. A closest point to the point $q_i$ in the actual edge milling three-dimensional point cloud P is searched for and denoted as $p_a$, in which the search is for any point in the edge milling trajectory point cloud Q, and i=1, 2, . . . , n.

Step S32. A matching objective function $f(R,t)$ based on uniform allowance is constructed using the point pair $(q_i, p_a)$, in which R, t respectively represents a rotation posture matrix of 3×3 of the actual edge milling three-dimensional point cloud P and a translation position matrix of 3×1 of the edge milling trajectory point cloud Q; then the pose parameters R and t are solved by minimizing the objective function. The solving method may be achieved through Taylor expansion or by deriving the objective function. To improve the matching accuracy, multiple iterations are required, and the number of iterations is approximately 50. The rotation and translation matrices obtained in an a-th iteration are denoted as $R_a$ and $t_a$, the total number of iterations is k, and the iteration method is:

$$\begin{bmatrix} R & t \\ 0_{1\times 3} & 1 \end{bmatrix} = \begin{bmatrix} R_k & t_k \\ 0_{1\times 3} & 1 \end{bmatrix} \cdots \begin{bmatrix} R_a & t_a \\ 0_{1\times 3} & 1 \end{bmatrix} \cdots \begin{bmatrix} R_2 & t_2 \\ 0_{1\times 3} & 1 \end{bmatrix} \begin{bmatrix} R_1 & t_1 \\ 0_{1\times 3} & 1 \end{bmatrix}.$$

The minimized objective function is min $$f(R, t) = \sum_{i=1}^{n} d_i^2 - \left(\sum_{i=1}^{n} d_i\right)^2 / n,$$

in which $d_i = \|Rp_a + t - q_i\|$, $d_i$ represents a distance from point $p_i'$ to point $q_i$, and n represents the number of points in the edge milling trajectory point cloud Q.

Step S33. A position of any point on the actual edge milling three-dimensional point cloud P is updated as $p_i' = Rp_a + t$, and $p_i - p_i'$ is assigned to obtain the pose updated edge milling three-dimensional point cloud P'.

The Step S40 includes the following steps.

Figure 3:
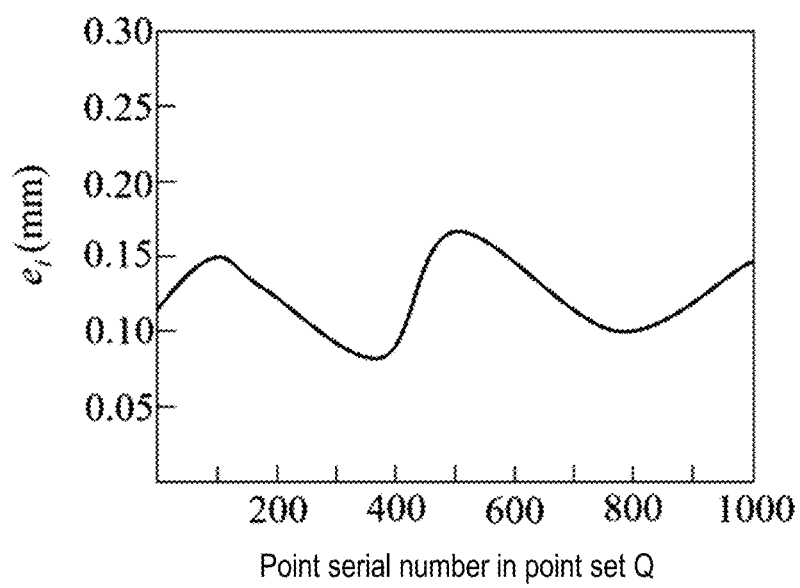
FIG. 3 is a schematic diagram of calculation results of allowance errors of the edge milling trajectory point cloud Q.

Step S41. A closest point $p_a'$ to the point $q_i$ is extracted from the three-dimensional point cloud P' according to the edge milling trajectory point cloud $Q = \{q_1, q_2, \ldots, q_i, \ldots, q_n\}$ and through methods such as Kd-tree (K-dimensional tree search calculation method), and then the edge milling allowance error of the point $q_i$ is $e_i = (q_i - p_a')^T n_i$; FIG. 3 shows the distribution of allowance errors at different points. It may be seen that the allowance errors are not uniformly distributed, and the distribution is mainly affected by the workpiece pose error. The allowance error is not zero, and the situation is mainly affected by the workpiece pose error. Through the relationship model of the allowance error with respect to the workpiece/cutter pose error, the model may be used to identify workpiece and cutter pose errors.

Step S42. The operation is started from the point $q_i$ to search for an upper boundary point $q_{ui}$ and a lower boundary point $q_{li}$ of the point $q_i$ along a positive direction of the second unit tangent vector $\tau_{i2}$ in the cross-section design model according to the edge milling trajectory point cloud Q, further, closest points $(p_{ua}', p_{la}')$ to the points $(q_{ui}, q_{li})$ are respectively extracted from the edge milling three-dimensional point cloud P' to construct an error vector $\tau_{i2}' = (2p_{ua}' - p_a' - p_{la}')/\|2p_{ua}' - p_a' - p_{la}'\|$ of a boundary inclination direction; and then the posture inclination error of edge milling is $\alpha_i = \arccos(\tau_{i2}^T \tau_{i2}')$.

Step S50 specifically includes the following steps.

Step S51. A position error vector of the initial workpiece pose parameter $_W^B T$ of the workpiece is defined as $^W d$, a position error vector of the initial cutter pose parameter $_U^B T$ is defined as $^U d$, and both $^W d$ and $^U d$ are vectors to be solved of $3\times 1$, in which $^U d$ is further expressed as $^U d = [0, 0, ^U d_z]$, and $^U d_z$ is a component of $^U d$ on a z-axis.

Step S52. The influence model of the position error of the workpiece on the edge milling allowance error and the influence model of the position error of the cutter on the edge milling allowance error when milling the i-th point of the workpiece are established respectively, in which the influence model of the position error of the workpiece on the edge milling allowance error when milling the i-th point of the workpiece is $e_{iw} = ^W d^T w_i$, and the influence model of the position error of the cutter on the edge milling allowance error when milling the i-th point of the workpiece is $e_{iu} = ^U d_z$. The two influence models established are combined to obtain an influence model of a combined error when milling the i-th point of the workpiece, in which the model is $e_i = ^W d^T w_i + ^U d_z$, and $w_i$ represents the unit normal vector of $q_i$.

Step S53. The influence model of the combined error when milling the i-th point of the workpiece is used to establish a matrix formula $e = ^W d^T N + ^U D$ for position error identification of all contact points of the workpiece and the cutter at different times, in which $N = [n_1, n_2, \ldots, n_i, \ldots n_n]$ is a matrix of $3\times n$, and $e = [e_1, e_2, \ldots, e_i, \ldots e_n]$ and $^U D = [^U d_z, ^U d_z, \ldots, ^U d_z]_{1\times n}$ are matrices of $1\times n$; and then the cutter position error is $$^U d_z = \sum_{i=1}^{n} e_i / n,$$

and the workpiece position error is $^W d = (NN^T)^{-1} N(e - ^U D)^T$.

Step S60 includes the following steps.

Step S61. A posture error vector of the initial workpiece pose parameter $_W^B T$ of the workpiece blank is defined as $^W \delta$, a posture error vector of the initial cutter pose parameter $_U^B T$ is defined as $^U \delta$, and both $^W \delta$ and $^U \delta$ are vectors to be solved of $3\times 1$; in which $^U \delta$ is further expressed as $^U \delta = [^U \delta_x, 0, 0]^T$, and $^U \delta_x$ is a component of $^U \delta$ on an x-axis.

Step S62. The influence model of the posture error of the workpiece on the edge milling error when milling the i-th point of the workpiece and the influence model of the posture error of the cutter on the edge milling error when milling the i-th point of the workpiece are established, in which the influence model of the posture error of the workpiece on the edge milling error when milling the i-th point of the workpiece is $\alpha_{iw} = \tau_{i2}^T \,^W \delta$, and the influence model of the posture error of the cutter on the edge milling error when milling the i-th point of the workpiece is $\alpha_{iu} = ^U \delta_x$, and then an influence model of a combined error when milling the i-th point of the workpiece is $$\alpha_i = ^U \delta_x + \tau_{i2}^T \,^W \delta = [1, \tau_{i2}^T] \begin{bmatrix} ^U \delta_x \\ ^W \delta \end{bmatrix} = a_i \xi,$$

in which $a_i = [1, \tau_{i2}^T]$ is a coefficient matrix of $1\times 4$, and $$\xi = \begin{bmatrix} ^U \delta_x \\ ^W \delta \end{bmatrix}$$

is a workpiece and cutter posture error combination vector of $4\times 1$.

Step S63. The influence model of the combined error of the i-th point is used to establish a posture error identification formula $\alpha = A\xi$ of all milling points of the workpiece and the cutter at different times, in which $\alpha = [\alpha_1, \alpha_2, \ldots, \alpha_i, \ldots \alpha_n]^T$ is a matrix of $n\times 1$, and $A = [a_1^T, a_2^T, \ldots, a_n^T]^T$ is a matrix of $n\times 4$; then, the workpiece and cutter pose combined error is solved as $\xi = (A^T A)^{-1} A^T \alpha$, in which $I_1 = [1,0,0,0]$, $$I_3 = \begin{bmatrix} 0 & 1 & 0 & 0 \\ 0 & 0 & 1 & 0 \\ 0 & 0 & 0 & 1 \end{bmatrix},$$

and the workpiece posture error and the cutter posture error are respectively $^U \delta_x = I_1 \xi$, $^W \delta = I_3 \xi$.

The above description is only a specific implementation mode of the disclosure, but the protection scope of the disclosure is not limited thereto. Any technician familiar with the technical field may easily think of changes or substitutions within the technical scope disclosed by the disclosure, and the changes or substitutions should be covered by the protection scope of the disclosure. Furthermore, the technical solutions of various embodiments of the disclosure may be combined with each other, but the operation has to be based on the fact that the combination may be implemented by ordinary technicians in the field, when the combination of technical solutions is contradictory or cannot be implemented, it should be deemed that such combination of technical solutions does not exist and is not within the protection scope required by the disclosure. Therefore, the protection scope of the disclosure should be based on the protection scope of the appended claims.

What is claimed is:

1. A workpiece and cutter pose calibration method based on robotic edge milling error tracking, comprising steps as follows:

Step S10, constructing an edge milling path of a cutter to the workpiece to generate a robotic edge milling trajectory point cloud Q;

Step S20, obtaining an actual edge milling three-dimensional point cloud P of the workpiece;

Step S30, matching an edge milling trajectory point cloud Q and the actual edge milling three-dimensional point cloud P into same coordinate system to generate a pose updated edge milling three-dimensional point cloud P';

Step S40, calculating an edge milling allowance error $e_i$ and a posture inclination error $\alpha_i$ according to the edge milling trajectory point cloud Q and the edge milling three-dimensional point cloud P';

Step S50, establishing respectively an influence model of a position error of the workpiece on the edge milling allowance error and an influence model of a position error of the cutter on the edge milling allowance error when milling an i-th point of the workpiece according to the edge milling allowance error $e_i$, and solving a workpiece position error $^W d$ and a cutter position error $^U d_z$;

Step S60, establishing respectively an influence model of a posture error of the workpiece on the edge milling error and an influence model of a posture error of the cutter on the edge milling error when milling the i-th point of the workpiece according to the posture inclination error $\alpha_i$, and solving a workpiece posture error $^U \delta_x$ and a cutter posture error $^W \delta$;

Step S70, updating a workpiece pose parameter and a cutter pose parameter according to the workpiece position error $^W d$, the cutter position error $^U d_z$, the workpiece posture error $^U \delta_x$, and the cutter posture error $^W \delta$;

Step S80, repeating the Step S40 to the Step S70 until a workpiece pose error vector is $^W V$ and a cutter pose error vector is $^U V$ and both of vectors are less than or equal to corresponding preset thresholds.

2. The workpiece and cutter pose calibration method according to claim 1, wherein the Step S10 comprises:

discretizing uniformly a boundary cross-section of a design model of the workpiece to generate the uniform and orderly edge milling trajectory point cloud Q={$q_1$, $q_2$, ..., $q_i$, ..., $q_n$}, wherein any point $q_i$ in the edge milling trajectory point cloud Q is a vector of 3×1, a unit normal vector $w_i$ of $q_i$ is perpendicular to a boundary lateral cross-section, and a positive direction is toward outside of the cross-section and is same as an edge milling depth direction, wherein a first unit tangent vector $\tau_{i1}$ of the point $q_i$ is parallel to a cross-section boundary direction and is same as a motion direction of an edge milling trajectory, wherein a second unit tangent vector $\tau_{i2}$ of the point $q_i$ is parallel to a curved surface thickness direction; constituting a coordinate system of the point $q_i$ together by three vectors ($\tau_{i1}$, $\tau_{i2}$, $w_i$), wherein the three vectors respectively correspond to directions of an x-axis, a y-axis, and a z-axis.

3. The workpiece and cutter pose calibration method according to claim 1, wherein the Step S20 comprises steps as follows:

Step S21, defining respectively an initial workpiece pose parameter and an initial cutter pose parameter as $_W{}^B T$ and $_U{}^B T$, wherein $_W{}^B T$ represents a pose of a workpiece coordinate system {W} relative to a base coordinate system {B}, $_U{}^B T$ represents a pose of a cutter coordinate system {U} relative to the base coordinate system {B}, and both of the workpiece pose parameter $_W{}^B T$ and the cutter pose parameter $_U{}^B T$ are homogeneous transformation matrices of 4×4;

Step S22, positioning an edge milling pose of a robot through the workpiece pose parameter $_W{}^B T$ and the cutter pose parameter $_U{}^B T$;

Step S23, performing edge milling on a workpiece blank according to the edge milling path, which is constructed, and after completion, performing three-dimensional scanning on a surface to be milling processed of the workpiece by a three-dimensional scanning device to obtain the actual edge milling three-dimensional point cloud P of the workpiece, wherein P={$p_1$, $p_2$, ..., $p_a$, ..., $p_m$}, and each point on the actual edge milling three-dimensional point cloud P is a vector of 3×1.

4. The workpiece and cutter pose calibration method according to claim 3, wherein the Step S30 comprises steps as follows:

Step S31, searching for a closest point to the point $q_i$ in the actual edge milling three-dimensional point cloud P and denoting as $p_a$, wherein the search is for any point $q_i$ in the edge milling trajectory point cloud Q, and i=1, 2, ..., n;

Step S32, constructing a matching objective function $f(R,t)$ based on uniform allowance using point pair ($q_i$, $p_a$), wherein R, t respectively represents a rotation posture matrix of 3×3 of the actual edge milling three-dimensional point cloud P and a translation position matrix of 3×1 of the edge milling trajectory point cloud Q; then solving pose parameters R and t by minimizing an objective function;

Step S33, updating a position of any one of the points $p_a$ on the actual edge milling three-dimensional point cloud P as $p'_a = Rp_a + t$, and assigning $p_a = p_a'$ to obtain the pose updated edge milling three-dimensional point cloud P', wherein P'={$p_1'$, $p_2'$, ..., $p_a'$, ..., $p_m'$}.

5. The workpiece and cutter pose calibration method according to claim 3, wherein an objective function to be minimized in the Step S32 is min $$f(R,t) = \sum_{i=1}^{n} d_i^2 - \left(\sum_{i=1}^{n} d_i\right)^2 / n,$$

wherein $d_i = \|Rp_a + t - q_i\|$, $d_i$ represents a distance from point $p_a'$ to point $q_i$, and n represents the number of points in the edge milling trajectory point cloud Q.

6. The workpiece and cutter pose calibration method according to claim 3, wherein the Step S40 comprises steps as follows:

Step S41, extracting a closest point $p_a'$ to the point $q_i$ from the edge milling three-dimensional point cloud P' according to the edge milling trajectory point cloud Q, wherein the edge milling allowance error of the point $q_i$ is $e_i = (q_i - p_a')^T w_i$;

Step S42, starting from the point $q_i$ to search for an upper boundary point $q_{ui}$ and a lower boundary point $q_{li}$ of the point $q_i$ along a positive direction of the second unit tangent vector $\tau_{i2}$ in a cross-section design model according to the edge milling trajectory point cloud Q, further, extracting respectively closest points ($p_{ua}'$, $p_{la}'$) to the points ($q_{ui}$, $q_{li}$) from the edge milling three-dimensional point cloud P' to construct an error vector $\tau_{i2}' = (2p_{ua}' - p_a' - p_{la}')/\|2p_{ua}' - p_a' - p_{la}'\|$ of a boundary inclination direction; wherein the posture inclination error of edge milling is $\alpha_i = \arccos(\tau_{i2}^T \tau_{i2}')$.

7. The workpiece and cutter pose calibration method according to claim 6, wherein the Step S50 comprises steps as follows:

Step S51, defining a position error vector of the initial workpiece pose parameter ${}_W^B T$ of the workpiece as ${}^W d$, defining a position error vector of the initial cutter pose parameter ${}_U^B T$ as ${}^U d$, and both ${}^W d$ and ${}^U d$ are vectors to be solved of 3×1; wherein ${}^U d$ is further expressed as ${}^U d = [0, 0, {}^U d_z]^T$, and ${}^U d_z$ is a component of ${}^U d$ on a z-axis;

Step S52, establishing respectively the influence model of the position error of the workpiece on the edge milling allowance error and the influence model of the position error of the cutter on the edge milling allowance error when milling the i-th point of the workpiece, wherein the influence model of the position error of the workpiece on the edge milling allowance error when milling the i-th point of the workpiece is $e_{iw} = {}^W d^T w_i$, and the influence model of the position error of the cutter on the edge milling allowance error when milling the i-th point of the workpiece is $e_{iu} = {}^U d_z$, combining two influence models established to obtain an influence model of a combined error when milling the i-th point of the workpiece, wherein the model is $e_i = {}^W d^T w_i + {}^U d_z$, and $w_i$ represents the unit normal vector of $q_i$;

Step S53, using the influence model of the combined error when milling the i-th point of the workpiece to establish a matrix formula $e = {}^W d^T N + {}^U D$ for position error identification of all contact points of the workpiece and the cutter at different times, wherein $N = [n_1, n_2, \ldots, n_i, \ldots, n_n]$ is a matrix of 3×n, and $e = [e_1, e_2, \ldots, e_i, \ldots e_n]$ and ${}^U D = [{}^U d_z, {}^U d_z, \ldots, {}^U d_z]_{1 \times n}$ are matrices of 1×n; wherein the cutter position error is $$^U d_z = \sum_{i=1}^{n} e_i / n,$$

and the workpiece position error is ${}^W d = (NN^T)^{-1} N(e - {}^U D)^T$.

8. The workpiece and cutter pose calibration method according to claim 6, wherein the Step S60 comprises steps as follows:

Step S61, defining a posture error vector of the initial workpiece pose parameter ${}_W^B T$ of the workpiece blank as ${}^W \delta$, defining a posture error vector of the initial cutter pose parameter ${}_U^B T$ as ${}^U \delta$, and both ${}^W \delta$ and ${}^U \delta$ are vectors to be solved of 3×1; wherein ${}^U \delta$ is further expressed as ${}^U \delta = [{}^U \delta_x, 0, 0]^T$, and ${}^U \delta_x$ is a component of ${}^U \delta$ on an x-axis;

Step S62, establishing respectively the influence model of the posture error of the workpiece on the edge milling error and the influence model of the posture error of the cutter on the edge milling error when milling the i-th point of the workpiece, wherein the influence model of the posture error of the workpiece on the edge milling error when milling the i-th point of the workpiece is $\alpha_{iw} = \tau_{i2}^T {}^W \delta$, and the influence model of the posture error of the cutter on the edge milling error when milling the i-th point of the workpiece is $\alpha_{iu} = {}^U \delta_x$; combining two influence models established to obtain an influence model of a combined error when milling the i-th point of the workpiece, wherein the model $$\alpha_i = {}^U \delta_x + \tau_{i2}^T {}^W \delta = [1, \tau_{i2}^T] \begin{bmatrix} {}^U \delta_x \\ {}^W \delta \end{bmatrix} = a_i \xi, \, a_i = [1, \, \tau_{i2}^T]$$

is a coefficient matrix of 1×4, and $$\xi = \begin{bmatrix} {}^U \delta_x \\ {}^W \delta \end{bmatrix}$$

is a workpiece cutter posture error combination vector of 4×1;

Step S63, using the influence model of the combined error of the i-th point to establish a posture error identification formula $\alpha = A\xi$ of all milling points of the workpiece and the cutter at different times, wherein $\alpha = [\alpha_1, \alpha_2, \ldots, \alpha_i, \ldots \alpha_n]^T$ is a matrix of n×1, and $A = [a_1^T, a_2^T, \ldots, a_n^T]^T$ is a matrix of n×4; solving the workpiece and cutter pose combined error as $\xi = (A^T A)^{-1} A^T \alpha$, wherein $I_1 = [1, 0, 0, 0]$, $$I_3 = \begin{bmatrix} 0 & 1 & 0 & 0 \\ 0 & 0 & 1 & 0 \\ 0 & 0 & 0 & 1 \end{bmatrix},$$

and the workpiece posture error and the cutter posture error are respectively ${}^U \delta_x = I_1 \xi$, ${}^W \delta = I_3 \xi$.

9. The workpiece and cutter pose calibration method according to claim 1, wherein unit normal vectors of all points on the edge milling trajectory point cloud Q in the Step S10 satisfies $$\sum_{i=1}^{n} w_i = 0_{3 \times 1}.$$

10. The workpiece and cutter pose calibration method according to claim 1, wherein the number n of points on the edge milling trajectory point cloud Q in the Step S10 satisfies n≥6.

* * * * *